(12) United States Patent
Helm

(10) Patent No.: US 11,640,262 B2
(45) Date of Patent: May 2, 2023

(54) IMPLEMENTING VARIABLE NUMBER OF BITS PER CELL ON STORAGE DEVICES

(71) Applicant: Micron Technology, Inc., Boise, ID (US)

(72) Inventor: Mark A. Helm, Santa Cruz, CA (US)

(73) Assignee: Micron Technology, Inc., Boise, ID (US)

( * ) Notice: Subject to any disclaimer, the term of this patent is extended or adjusted under 35 U.S.C. 154(b) by 82 days.

(21) Appl. No.: 16/868,868

(22) Filed: May 7, 2020

(65) Prior Publication Data

US 2021/0349662 A1 Nov. 11, 2021

(51) Int. Cl.
*G06F 12/00* (2006.01)
*G06F 3/06* (2006.01)

(52) U.S. Cl.
CPC .......... *G06F 3/0659* (2013.01); *G06F 3/0611* (2013.01); *G06F 3/0653* (2013.01); *G06F 3/0673* (2013.01)

(58) Field of Classification Search
CPC .... G06F 3/0611; G06F 3/0653; G06F 3/0659; G06F 3/0673
See application file for complete search history.

(56) References Cited

U.S. PATENT DOCUMENTS

| | | | | |
|---|---|---|---|---|
| 8,886,877 | B1* | 11/2014 | Avila | G06F 12/0246 |
| | | | | 711/E12.008 |
| 9,201,788 | B1* | 12/2015 | Avila | G11C 11/005 |
| 9,524,794 | B1* | 12/2016 | Shapira | G11C 16/349 |
| 9,891,859 | B1* | 2/2018 | Vogan | G11C 16/10 |
| 10,153,046 | B1* | 12/2018 | Agarwal | G11C 16/10 |
| 10,275,172 | B2* | 4/2019 | Pahwa | G11C 16/30 |
| 10,552,058 | B1* | 2/2020 | Jadon | G06F 3/0647 |
| 2013/0117620 | A1* | 5/2013 | Joo | G11C 16/3418 |
| | | | | 714/E11.023 |
| 2016/0141047 | A1* | 5/2016 | Sehgal | G11C 11/5628 |
| | | | | 365/185.02 |
| 2017/0139826 | A1* | 5/2017 | Sugimori | G06F 12/0246 |
| 2017/0285967 | A1 | 10/2017 | Pandurangan et al. | |

(Continued)

FOREIGN PATENT DOCUMENTS

KR 20190118030 A 10/2019

OTHER PUBLICATIONS

PCT Notification of Transmittal of The International Search Report and The Written Opinion of The International Searching Authority for PCT Application No. PCT/US2021/031181, dated Sep. 1, 2021, 9 pages.

*Primary Examiner* — Mohamed M Gebril
(74) *Attorney, Agent, or Firm* — Lowenstein Sandler LLP

(57) ABSTRACT

Systems and methods are disclosed including a memory component and a processing device, coupled to the memory component. The processing device can program a block of the memory component using a first type of memory cells storing a first number of bits per memory cell. The processing device can then determine that an amount of memory used of the memory component is greater than a capacity threshold. Responsive to determining that a frequency of access to the block meets a criterion, the processing device can then program the block using a second type memory cells storing a second number of bits per memory cell, wherein the second number of bits exceeds the first number of bits.

17 Claims, 5 Drawing Sheets

(56) References Cited

U.S. PATENT DOCUMENTS

| | | | |
|---|---|---|---|
| 2017/0337977 A1* | 11/2017 | Yasukawa | G11C 16/3418 |
| 2018/0081594 A1 | 3/2018 | Jung et al. | |
| 2018/0294029 A1* | 10/2018 | Rao | G11C 29/52 |
| 2019/0095116 A1* | 3/2019 | Igahara | G06F 3/0634 |
| 2019/0102083 A1 | 4/2019 | Dusija et al. | |
| 2019/0243771 A1 | 8/2019 | Mittal et al. | |
| 2019/0294341 A1* | 9/2019 | Sunata | G06F 3/0679 |
| 2019/0354478 A1* | 11/2019 | Kashyap | G06F 11/1072 |
| 2019/0369899 A1* | 12/2019 | Tanpairoj | G06F 1/324 |
| 2021/0117106 A1* | 4/2021 | Yang | G06F 3/0679 |
| 2021/0303203 A1* | 9/2021 | Eliash | G06F 11/1048 |

* cited by examiner

IMPLEMENTING VARIABLE NUMBER OF BITS PER CELL ON STORAGE DEVICES

TECHNICAL FIELD

Embodiments of the disclosure relate generally to memory sub-systems, and more specifically, relate to implementing variable number of bits per cell on storage devices.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various implementations of the disclosure.

DETAILED DESCRIPTION

Figure 1:
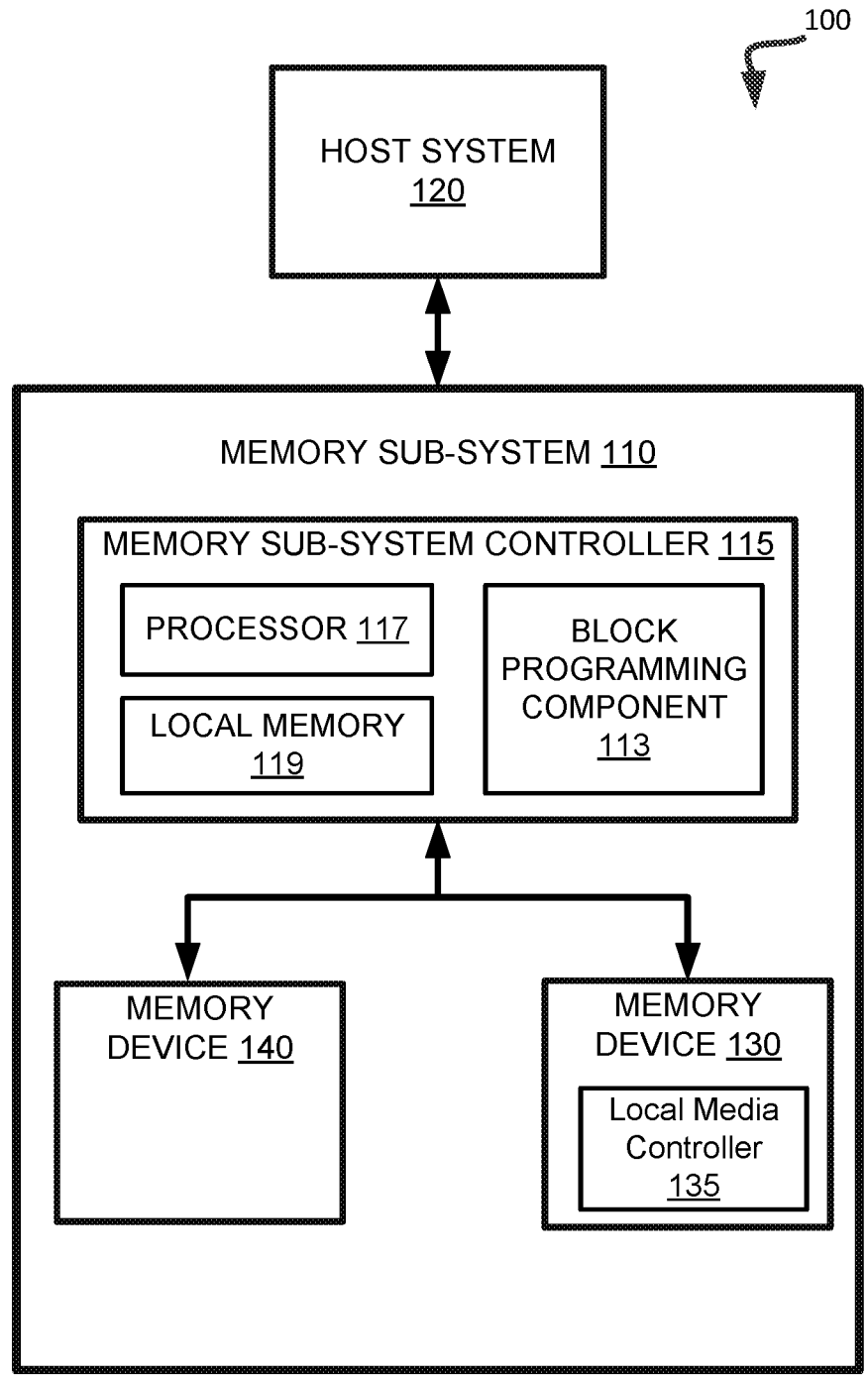
FIG. 1 illustrates an example computing environment that includes a memory sub-system in accordance with some embodiments of the present disclosure.

Aspects of the present disclosure are directed to reprogramming blocks based on frequency of access. A memory sub-system can be a storage device, a memory module, or a hybrid of a storage device and memory module. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

A memory component of a conventional memory sub-system can include memory cells that can store one or more bits of data (e.g., data received from the host system). For example, a memory component can include single-level cells (SLCs) that each store one bit of data, multi-level cells (MLCs) that each store two bits of data, triple-level cells (TLCs) that each store three bits of data, quad-level cells (QLCs) that each store four bits of data, and/or penta-level cells (PLCs) that each store five bits of data. One or more memory cells of the memory component can be grouped together to form a block.

Each type of memory cell (e.g., SLCs, MLCs, TLCs, QLCs, and PLCs) can exhibit different characteristics and advantages. For example, an SLC can have a lower read latency (e.g., how long it takes for data stored at the SLC to be read), a faster programming time (e.g., how long it takes to program data received from the host system to the cell for storage) and a greater reliability for data stored at the SLC than the other types of memory cells. However, since each SLC only stores a single bit of data, a memory component including SLCs will have a lower storage capacity when compared to a memory component having the same total number of memory cells, but including at least some MLCs, TLCs, QLCs, and/or PLCs, which store multiple bits of data per memory cell.

In another example, a QLC stores four bits of data per memory cell, but can have a higher read latency, a slower programming time and a lower reliability for data stored at the QLC than the other types of memory cells. A memory component including QLCs will have a higher storage capacity when compared to a memory component including only SLCs, MLCs and TLCs, but the amount of time to read and write data to the memory component including QLCs will be greater than a memory component including other types of memory cells. For example, an average read time for a QLC can be approximately 80 microseconds ($\mu s$), while the average read time for an SLC can be approximately 25 $\mu s$. Furthermore, the reliability for data stored at the memory component including QLCs can be lower than a memory component including other types of memory cells.

Accordingly, to minimize the amount of time for data received from a host system to be programmed to the memory component, a memory sub-system can include a first portion of a memory component that includes SLCs and a second portion of the memory component that includes QLCs. When data is received from a host system for storage by the memory sub-system, the memory sub-system can initially program the data to the first portion of the memory component that includes SLCs, which have a faster programming speed. Once the memory sub-system is idle (e.g., is not receiving instructions from the host system), the memory sub-system relocates the data stored at the first portion including SLCs to the second portion including QLCs, which have a higher storage capacity than the SLCs. The memory sub-system may perform this process, also known as SLC caching, when new data is received from the host system for storage by the memory sub-system. The process provides the benefits of the faster programming speed of SLCs while also utilizing the higher storage capacity of QLCs.

However, when a host system requests the data stored at the memory sub-system, the data that has been evicted from the SLC cache needs to be read from the QLCs. As previously discussed, QLCs have a higher read latency than other types of memory cells. Reading the data from the QLCs of the memory component results in the data taking a longer time to be provided to the host system than if the data were stored at SLCs of the memory component, decreasing the performance of the memory sub-system.

Aspects of the present disclosure address the above and other deficiencies by dynamically reprogramming physical blocks of memory components using different types memory cells (e.g., SLCs, MLCs, TLCs QLCs, and PLCs) based on a frequency of access to the data stored on the physical block. The number of bits per memory cell utilized for storing the data can be reverse proportional the frequency of access. For example, constantly accessed data can be programmed in SLCs, frequency accessed user data can be programmed in MLCs, infrequency accessed user data can be programmed in TLCs, sparingly accessed user data can be programmed in QLCs, and rarely accessed user data can be programmed in PLCs. The frequency of access can include, for example, a rate of access within a time period. In one example, the memory sub-system can track and maintain read counts for blocks storing user data. In another example, the memory sub-system can track and maintain error rates of word lines of a memory component. Upon determining the frequency of access to the one or more blocks, the memory sub-system can reprogram the one or more blocks from one type of memory cells to a different type of memory cells during a subsequent write operation. When reprogramming data pages from a lower bits-per-cell memory cell to a higher bits-per-cell memory cell, (e.g., SLC to QLC, MLC to TLC, etc.), the memory sub-system can program another, unrelated bit of data, into the memory cell, while keeping the previously programmed bit. This effectively converts the SLC to a MLC. The newly programmed bit can come in from the host system, and has no relation to the previously programmed bit in the memory cell. Alternatively, the memory sub-system can combine bits of data from multiple lower bits-per-cell memory cell to one or more higher bits-per-cell memory cell.

Further aspects of the present disclosure enable dynamic switching between programming (writing data) in different types of memory cells based on a fullness of the memory component. For example, the memory sub-system can operate in an SLC mode of operation (e.g., program a block in SLCs) until the memory usage meets a first capacity criterion (e.g., reaches or exceeds a first capacity threshold). A capacity threshold can be represented by an amount of memory used, a percentage or a level of memory filled, etc. Once a first capacity criterion is met (e.g., first capacity threshold is reached), the memory sub-system can enable dynamic switching from the SLC mode of operation to a MLC mode of operation based on a frequency of access to the each block. For example, the memory sub-system can reprogram the one or more blocks from SLCs to MLCs during a subsequent write operation based on the frequency of access to each block. As discussed above, reprogramming blocks can include programming another, unrelated bit of data, into the memory cell, while keeping the previously programmed bit, or combining bits of data from multiple lower bits-per-cell memory cell to one or more higher bits-per-cell memory cell. Additionally, the memory sub-system can program all unused blocks in MLCs.

Additional capacity thresholds can be used to enable switching to higher bits-per-cell modes of operation (e.g., a TLC mode of operation, a QLC mode of operation, etc.). For example, when memory usage meets a second capacity criterion (e.g., reaches or exceeds a second capacity threshold), the memory sub-system can enable dynamic switching from the SLC mode of operation, the MLC mode of operation, and the TLC mode of operation based on a frequency of access to the each block. In another example, when memory usage meets a third capacity criterion (e.g., reaches or exceeds a third capacity threshold), the memory sub-system can enable dynamic switching between the SLC mode of operation, the MLC mode of operation, the TLC mode of operation, and the QLC mode of operation based on a frequency of access to the each block.

Advantages of the present disclosure include, but are not limited to, improved performance and energy consumption due to utilizing lower bits-per-cell memory cell when the memory component is not filled to certain capacity thresholds, a reduced read latency for frequently read data that is maintained in or relocated to the low latency portion of the memory component, and automatic performance maximization and minimization of energy consumption based on an amount of data stored and a frequency of access. The reduced read latency results in a host system receiving the frequently read data in a shorter amount of time and an improvement in the performance of the memory sub-system. Furthermore, as previously discussed, memory cells in the low latency portion of the memory component, such as SLCs, have a greater reliability for storing data in comparison to memory cells having a higher storage density, such as QLCs. By storing frequently read data in memory cells that have a greater reliability for storing data, the number of error correction operations performed by the memory sub-system is reduced, thus saving power due to lower error checking and correcting (ECC) power necessary to correct data with fewer bits, allowing the memory sub-system to perform other operations (e.g., read and/or write operations), and improving the performance of the memory sub-system.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access the memory components (e.g., memory devices 130) when the memory sub-system 110 is coupled with the host system 120 by the PCIe interface. The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include negative-and (NAND) type flash memory and write-in-place memory, such as three-dimensional cross-point ("3D cross-point") memory. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLCs) can store one bit per cell. Other types of memory cells, such as multi-level cells (MLCs), triple level cells (TLCs), quad-level (QLCs), and penta-level cells (PLCs) cells, can store multiple bits per cell. In some embodiments, each of the memory devices 130 can include one or more arrays of memory cells such as SLCs, MLCs, TLCs, QLCs, PLCs or any combination of such. In some embodiments, a particular memory device can include an SLC portion, and an MLC portion, a TLC portion, a QLC portion and a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as a 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor 117 (e.g., a processing device) configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local controller 135) for media management within the same memory device package. An example of a managed memory device is a managed NAND (MNAND) device.

The memory sub-system 110 includes a block programming component 113 that can be used to program blocks using multiple memory cell types. In some embodiments, the controller 115 includes at least a portion of the block programming component 113. For example, the controller 115 can include a processor 117 (processing device) configured to execute instructions stored in local memory 119 for performing the operations described herein. In some embodiments, the block programming component 113 is part of the host system 120, an application, or an operating system.

Memory cells programmed in SLC mode are programmed faster, more reliably, and have a longer lifetime than cells programmed in MLC mode, TLC mode, QLC mode, and PLC mode. Memory cells programmed in higher level modes (e.g., MLC mode, TLC mode, QLC mode, and PLC mode) can store more bits-per-cell, but are programmed slower, less reliably, and have a shorter lifetime than cells programmed in SLC mode. It can be desirable to operate a memory cell in SLC mode to retain the performance advantages of SLC rather than to automatically operate in a higher level mode.

The memory sub-system can 110 read a memory cell by measuring a flow of electricity between a source and a drain of the memory cell. A voltage threshold above which current will flow between the source and the drain varies with a state of a floating gate in the memory cell. The memory sub-system 110 can apply a read-point voltage across the source and the drain and test the current. For SLCs, when the current is at a high enough level, the memory cell is at a binary 1. Otherwise, the memory cell is at a binary 0. This means the SLC includes two states and one threshold voltage, and can hold one bit per cell. Thus, one SLC holds one page of data. MLCs include four states and three threshold voltages, where each binary value (i.e., 00, 10, 01, and 11) has a different threshold voltage, and can hold two bits per cell. Thus, one MLC holds two pages of data. TLCs include eight states and seven threshold voltages, where each binary value (i.e., 000, 001, 010, 011, 100, 101, 110, and 111) has a different threshold voltage, and can hold three bits per cell. Thus, one TLC holds three pages of data. QLCs include sixteen states and fifteen threshold voltages, where each binary value (i.e., 0000, 0001, 0010, 0011, 0100, 0101, 0110, 0111, 1000, 1001, 1010, 1011, 1100, 1101, 1110, and 1111) has a different threshold voltage, and is four bits per cell. Thus, one QLC holds four pages of data. PLCs include thirty two states and thirty one threshold voltages, where each binary value (i.e., 00000, 00001, 00010, 00011, 00100, 00101, 00110, 00111, 01000, 01001, 01010, 01011, 01100, 01101, 01110, 01111, 10000, 10001, 10010, 10011, 10100, 10101, 10110, 10111, 11000, 11001, 11010, 11011, 11100, 11101, 11110, and 11111) has a different threshold voltage, and is five bits per cell. Thus, one PLC holds five pages of data.

When reprogramming a block from a lower level memory cell to a higher level memory cell (e.g., SLC to QLC, MLC to TLC, etc.), in a first example, the block programming component 113 can overwrite (reprogram) "new" bit(s) on top of "old" (existing) bits. This allow for the block programming component 113 to retain and condense existing data to a smaller amount of memory cells, while writing additional or new data to the remainder of the block. Accordingly, the block can include adjacent pages related to different data. The controller 115 can manage the relationship of these pages.

In another example, the block programming component 113 can combine data from multiple lower level memory cells to one or more higher level memory cells. For example, the block programming component 113 can select three pages of data from SLC memory cell, and write the data into a single TLC memory cell; can select four pages of data from two MLC memory cells, and write the data into a single QLC memory cell; etc. The controller 115 can manage the relationship of these pages.

The block programming component 113 can dynamically determine the frequency of access to each block of memory device 130 and/or memory device 140. The frequency of access can be represented by the duration of time between two consequent accesses operations, the duration of time between a write operation and a read operation, the rate of access within a time period, etc. The block programming component 113 can use different methods of determining the access frequency. In one example, read counts for blocks storing user data are tracked and maintained by the memory sub-system. The block programming component 113 can utilize the read counts to identify the frequency of access by determining whether the read counts exceed a certain read count threshold or fall within a certain read range. In another example, the block programming component 113 can use error rates of word lines (rows of memory cells) or of bit lines (columns of memory cells) of a memory component to determine the frequency of access of one or more proximate word lines or bit lines, respectively. The block programming component 113 can reprogram the block(s) from one type of memory cells to a higher bit-per-cell density memory cells during a subsequent write operation when the frequency of access meets a criterion regarding the current bit-per-cell density.

The block programming component 113 can maintain a plurality of ranges used to determine the frequency of access to a certain block. In an example, the block programming component 113 includes a first range value, a second range value, and a third range value, a fourth range value, and a fifth range value, where each range value is associated with a the number of bits per cell to be utilized during a subsequent write operation with respect to the block. The first range value can be between 0 and a first frequency, the second range value can be between the first frequency and a second frequency, the third range value can be between the second frequency and a third frequency, the fourth range value can be between the third frequency and a fourth frequency, and the fifth range value can a value above the fourth frequency. Each of the range values can be associated with a type of memory cell. For example, the first range value can be associated SLCs, the second range value can be associated with MLCs, the third range value can be associated with TLCs, the fourth range value can be associated with QLCs, and the fifth range value can be associated with PLCs. The block programming component 113 can, in response to determining the frequency of access for one or more blocks, reprogram the block(s) from a first type of memory cells on with data was previously written, to a different type of memory cells associated with the frequency of access. For example, the block programming component 113 can initially program a block in SLCs. Next, in response to determine that the frequency of access to the block is within the third range value, the block programming component 113 can reprogram the block by programming all data pages within the block from SLCs to MLCs during a second write operation.

In an example, when reprogramming data pages from a lower bits per cell memory cell to a higher bits per cell memory cell, (e.g., SLC to QLC, MLC to TLC, etc.), the memory sub-system can program another, unrelated bit of data, into the memory cell, while keeping the previously programmed bit. This effectively converts the SLC to a MLC. The newly programmed bit can come in from the host system, and has no relation to the previously programmed bit in the memory cell. In another example, when reprogramming data pages from a lower bits per cell memory cell to a higher bits per cell memory cell, the memory sub-system can combine unrelated data from two different bits in two lower level memory cells (e.g., two SLCs) to new higher level memory cell (e.g., a MLC) having two bits. The newly combined bits can have no relation to each other. The controller 115 can track which data entry relates to which bit in the memory cell. For example, a flash translation layer (FTL) can be used to map a logical address associated with a data entry to a physical address in the memory sub-system 110. An FTL can include an address mapping table, such as a logical-to-physical (L2P) table, in the local memory 119 of the memory sub-system 110 to perform the mapping operation. Accordingly, memory devices 130, 140 can include SLCs, MLCs, TLCs, QLCs, and PLCs simultaneously.

The memory sub-system can enable dynamic switching between different modes of operation based on a used capacity of the memory component. For example, block programming component 113 can operate memory devices 130, 140 in SLC mode until the memory usage meets a first capacity criterion. For example, the first capacity criterion can include exceeding a first capacity threshold. Capacity thresholds can include an amount of memory used, a percentage or a level of memory filled, etc. Once the first capacity criterion is met (e.g., first capacity threshold is reached), the block programming component 113 can enable dynamic switching between the SLC mode of operation and the MLC mode of operation based on a frequency of access to the each block. Additional capacity criterion (e.g., capacity thresholds) can be used to enable switching to higher modes of operation. For example, when memory usage meets a second capacity criterion (such as, for example, exceeding a second capacity threshold), the block programming component 113 can enable dynamic switching between the SLC mode of operation, the MLC mode of operation, and the TLC mode of operation based on a frequency of access to the each block. In another example, when memory usage meets a third capacity criterion (such as, for example, exceeding a third capacity threshold), the block programming component 113 can enable dynamic switching between the SLC mode of operation, the MLC mode of operation, the TLC mode of operation, and the QLC mode of operation based on a frequency of access to the each block. Further details with regards to the operations of the block programming component 113 are described below.

The host system 120 can dynamically change or update frequency of access thresholds and capacity thresholds. For example, the controller 115 can receive commands or operations from the host system 120 indicating one of more updated (revised) frequency of access thresholds or one or more updated capacity thresholds.

A portion of the memory device 130 and/or 140 can be reserved for SLC caching. SLC caching can be used when the memory sub-system 110 is programming user data in multiple modes of operation, or not in SLC mode. SLC caching stores incoming write data in SLC memory cells prior to being written to a different type of memory cell (e.g., MLC, TLC, QLC, etc.). This is performed to avoid loss of data and to minimize an amount of time for data received from the host system 120 to be programmed to memory devices 130, 140. For example, the memory sub-system 110 can receive write data to be stored in MLC memory cells, and initially stores the write data in SLC memory cells, which have a faster write time. The memory sub-system 110 then copies the write data from the SLC memory cells to MLC memory cells. The potential loss of data resulting from power loss during the write operation to the MLC memory cells is avoided because all of the data stored in the SLC memory cells can be retrieved after power is restored.

When data at a block is invalidated, such that when a garbage collection operation is performed, that data can be erased, thereby allowing the block to be programmed with new data. New data programmed onto the block can be programmed in SLC mode, thereby storing the new data on memory cells having a lower read latency, a faster programming time, and a greater reliability. Garbage collection operations can be dependent upon frequency of access to data on the block.

Figure 2:
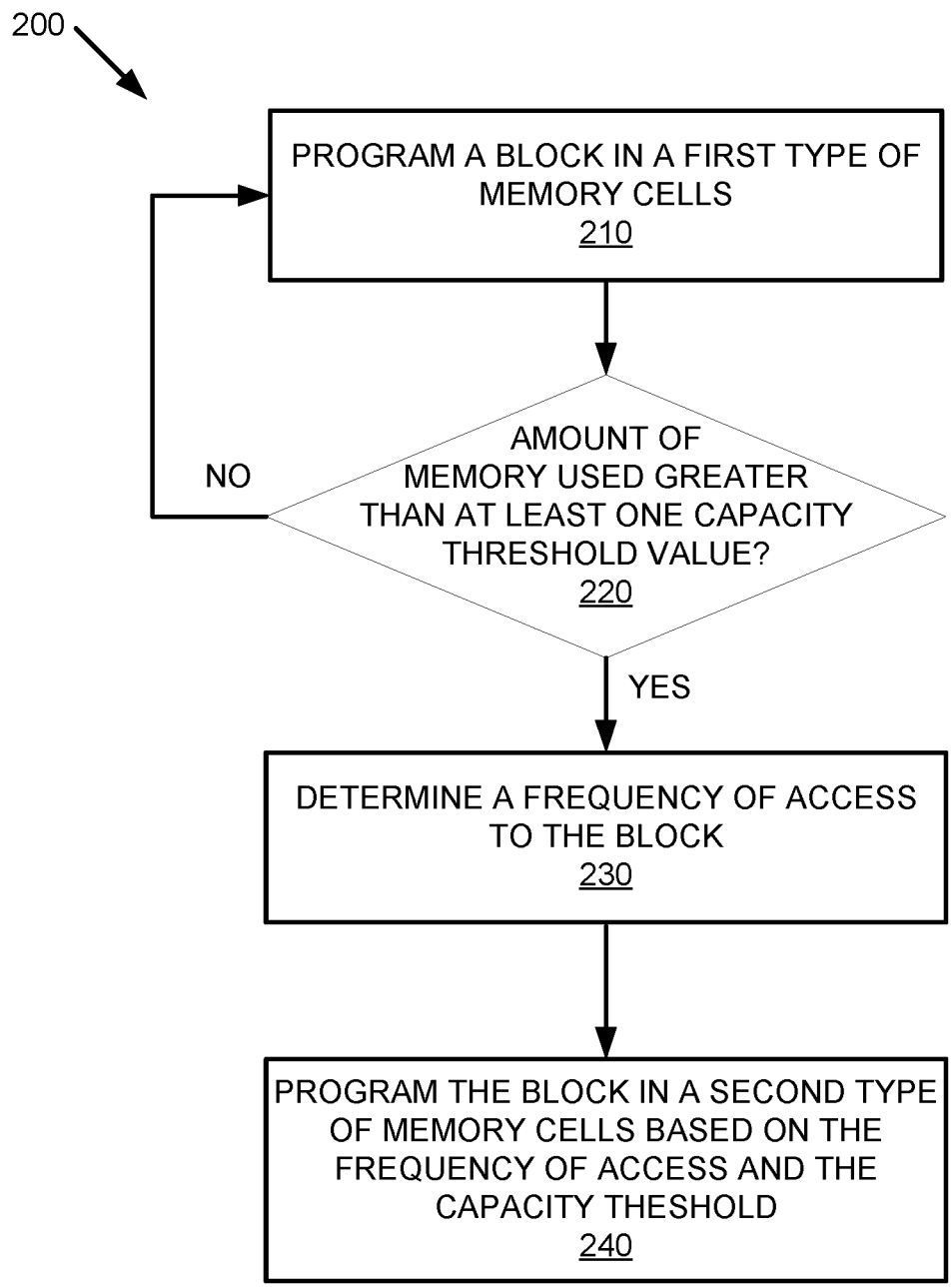
FIG. 2 is a flow diagram of an example method to dynamically reprogram blocks based on a frequency of access, in accordance with some embodiments of the present disclosure.

FIG. 2 is a flow diagram of an example method 200 of dynamically reprograming blocks based on the frequency of access, in accordance with some embodiments of the present disclosure. The method 200 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 200 is performed by the block programming component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible. For ease of understanding and brevity, the below embodiments discuss use of SLCs, MLCs, TLCs, and QLCs. However, it is noted that the below embodiments can implement additional types of memory cells, such as PLCs.

At block 210, the processing logic programs a block in a first type of memory cells. By way of example, the first type of memory cells can be SLC memory cells, since memory cells programmed in SLC mode are programmed faster, more reliably, and have a longer lifetime than cells programmed in higher level modes. However, in other embodiments, the first type of memory cells can include MLCs, TLCs, QLCs, or PLCs. In an embodiment, a host system can indicate to the memory sub-system a type of memory cells to program the block in. For example, the host system can indicate to the memory sub-system to program user data in first block in TLC mode, since the host system can sometimes anticipate the rate of access to the user data. In an example, the host system may include metadata in a write command to the memory sub-system that indicates a desired bit density to program the user data in or an expected access frequency of the user data.

At block 220, the processing logic determines whether an amount of memory used of the memory component is greater than at least one capacity threshold value. The capacity threshold(s) can include an amount of memory used, a percentage or a level of memory filled, etc. For example, a first capacity threshold value includes the memory used being greater than or equal 25% of available memory, but less than 50% of available memory. A second capacity threshold value includes the memory used being greater than or equal 50% of available memory, but less than 75% of available memory. A third capacity threshold value includes the memory used being greater than or equal 75% of available memory. The above threshold values are used by way of example, and any threshold values can be used. Each capacity threshold value can be associated with allowing the processor logic program in one or more modes of operation. For example, when the first capacity threshold is not reached, the processing logic returns to block 210, where it continues to program the first block in the first type of memory cells. When the first capacity threshold is reached, the processing logic enables programming blocks in SLC mode and MLC mode. When the second capacity threshold is reached, the processing logic enables programming blocks in SLC mode, MLC mode, and TLC mode. When the third capacity threshold is reached, the processing logic enables programming blocks in SLC mode, MLC mode, TLC mode, and QLC mode. The processing logic then proceeds to block 230.

At block 230, the processing logic determines a frequency of access to the block. The frequency of access can be represented by the duration of time between two consequent accesses operations, the duration of time between a write operation and a read operation, a rate of access within a time period, etc. The processing logic can use different methods of determining whether a block was accessed. In one example, the processing logic tracks and maintains read counts for blocks storing user data. The processing logic can utilize the read counts to identify the frequency of access by determining whether the read counts exceed one or more read thresholds or fall within one or more read ranges. In another example, the processing logic can use error rates of word lines or of bit lines of the memory component to determine the frequency of access of one or more proximate word lines or bit lines, respectively.

In an example, the frequency of access can includes a first read count threshold, a second read count threshold, and a third read count threshold, where each read count threshold is associated with a type of memory cell that a block is to be programmed in during a subsequent write operation. Each read count threshold can be counted during a specific time period. For example, the first read count threshold can include values between a first read count and a second read count. The second read count threshold can include values between a second read count and a third read count. The third read count threshold can include values above a third read count. For example, when a read count of a block is below the first read count threshold, the user data on the block can be reprogrammed using QLCs in a subsequent write operation (or the highest level memory cell allowed by the capacity threshold). When a read count of a block is greater than or equal to the first read count threshold, but below the second read count threshold, the user data on the block can be reprogrammed using TLCs in a subsequent write operation. When a read count of a block is greater than or equal to the second read count threshold, but below the third read count threshold, the user data on the block can be reprogrammed using MLCs in a subsequent write operation. When a read count of a block is greater than or equal to the third read count threshold, the user data on the block can be reprogrammed in SLCs in a subsequent write operation.

In another example, the frequency of access can includes a first range value, a second range value, and a third range value, and a fourth range value, where each range value is associated with a type of memory cell that a block is to be programmed in during a subsequent write operation. The first range value can be between 0s and a first frequency, the second range value can be between the first frequency and a second frequency, the third range value can be between the second frequency and a third frequency, and the third range value can a value above the third frequency. Each of the range values can be associated with a type of memory cell. For example, the first range value can be associated SLCs, the second range value can be associated with MLCs, the third range value can be associated with TLCs, and the fourth range value can be associated with QLCs.

At block 240, the processing logic programs the block in a second type memory cells based on the frequency of access and the capacity threshold. The second type of memory calls can include at least one of MLCs, TLCs, QLC, and PLCs. For example, when the capacity threshold is the third capacity threshold value (e.g., memory used is greater than or equal 75% of available memory), and the frequency of access for the block includes the third range value (which is associated with TLCs), then the processing logic programs the block in TLC mode. In another example, when the capacity threshold is the first capacity threshold value (e.g., memory used is greater than or equal 25% of available memory, but less than 50% of available memory), and the frequency of access for the block includes the third range value (which is associated with TLCs), then the processing logic programs the block in MLC mode. This is because, despite the frequency of access to the block indicating that the data should be written in TLCs during this write operation, the capacity threshold only allows writing in either SLC mode or MLC mode. In yet another example, where user data on the block is programed in TLCs, and when the capacity threshold is the third capacity threshold value (e.g., memory used is greater than or equal 75% of available memory), and the frequency of access for the block includes the first range value (which is associated with SLCs), then the processing logic programs the block in SLC mode. It should be understood that because the TLCs have a higher storage capacity when compared to SLCs, the user data can be programmed to more than one block during this write operation.

In an example, when reprogramming the block from a lower bits-per-cell memory cell to a higher bits-per-cell memory cell, (e.g., SLC to QLC, MLC to TLC, etc.), the processing logic can program another, unrelated bit of data, into the memory cell, while keeping the previously programmed bit. The newly programmed bit can come in from the host system, and has no relation to the previously programmed bit in the memory cell. In another example, when reprogramming the block from a lower bits per cell memory cell to a higher bits per cell memory cell, the processing logic can combine unrelated data from two different bits in two lower level memory cells (e.g., two SLCs) and program a new higher level memory cell (e.g., a MLC) having two bits. The newly combined bits can have no relation to each other. The same block can reprogrammed and combine the bits of the two memory cells, or a different block can be programmed or reprogrammed with the data of the two memory cells. The controller can track which data entry relates to which bit in the memory cell using, for example, an address mapping table.

Figure 3A:
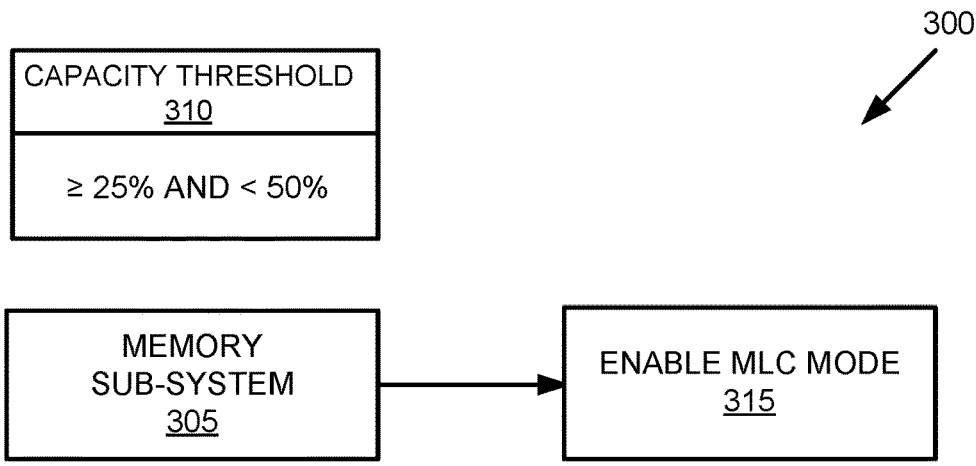
FIG. 3A-3C is are illustrations of a memory sub-system enabling a mode of operation based on a capacity threshold, in accordance with some embodiments of the present disclosure.

FIG. 3A is an illustration of a memory sub-system 300 determining whether an amount of memory used of the memory component is greater than at least one capacity threshold value, in accordance with some embodiments of the disclosure. As previously discussed, the memory sub-system can enable dynamic switching between different modes of operation based on a fullness of the memory component. In some embodiments, the memory sub-system 300 can determine whether to enable dynamic switching between different modes of operation based on how much of the available memory of the memory component is being used (e.g., programmed to).

Regarding FIG. 3A, a first capacity threshold value 310 includes the memory used being greater than or equal 25% of available memory, but less than 50% of available memory. When the memory used falls within the first capacity threshold value, the memory sub-system 305 enables MLC mode, at block 315. Accordingly, during subsequent write operations, user data can be reprogramed into either SLCs or MLCs, depending on a frequency of access to that user data.

Figure 3B:
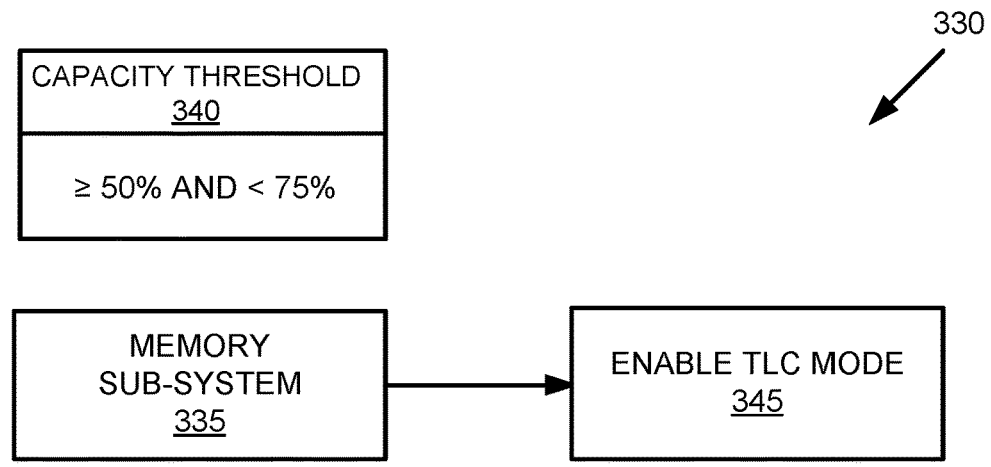

FIG. 3B is an illustration of a memory sub-system 330 that shows a second capacity threshold value 340 which includes the memory used being greater than or equal 50% of available memory, but less than 75% of available memory. When the memory used falls within the second capacity threshold value, the memory sub-system 335 enables TLC mode, at block 345. Accordingly, during subsequent write operations, user data can be reprogramed into either SLCs, MLCs, or TLCs, depending on a frequency of access to that user data.

Figure 3C:
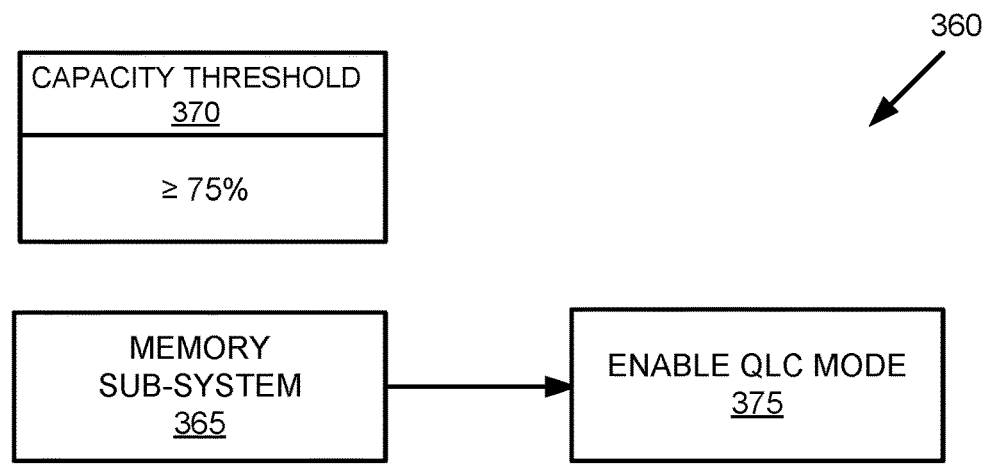

FIG. 3C is an illustration of a memory sub-system 360 that shows a third capacity threshold value 370 which includes the memory used being greater than or equal 75% of available memory. When the memory used falls within the third capacity threshold value, the memory sub-system 365 enables QLC mode, at block 375. Accordingly, during subsequent write operations, user data can be reprogramed into either SLCs, MLCs, TLCs, or QLCs, depending on a frequency of access to that user data.

Figure 4:
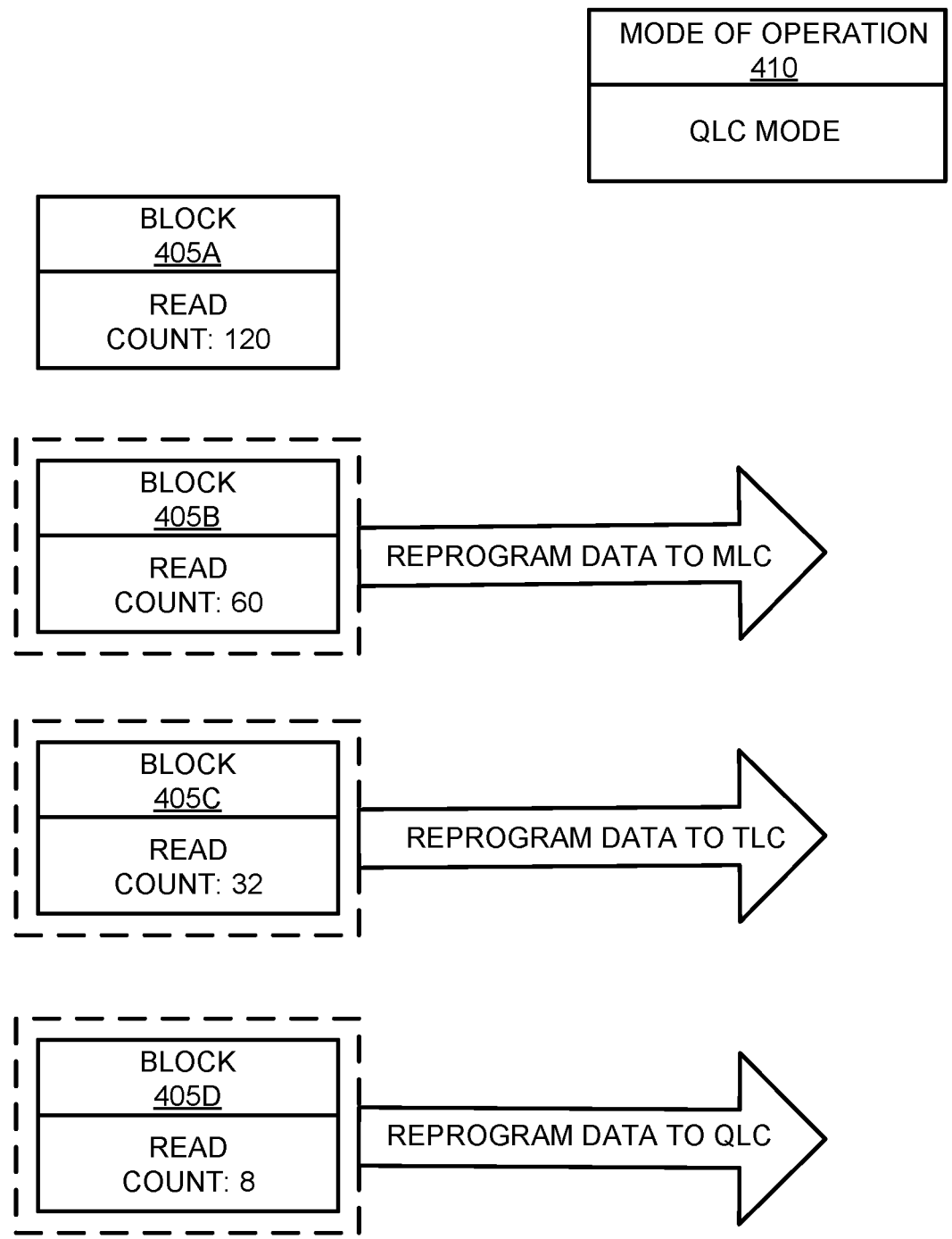
FIG. 4 is an illustration of a memory sub-system 400 determining which blocks to program using different memory cells during subsequent write operations based on a frequency of access.

FIG. 4 is an illustration of a memory sub-system 400 determining which blocks to program using different memory cells during subsequent write operations based on a frequency of access. The block can be programmed during a first write operation in SLCs. By way of example, the mode of operation 410 is QLC mode, where the user data can be reprogramed into either SLCs, MLCs, TLCs, or QLCs. By further way of example, the frequency of access is determined using read counts during a predetermined time period, where the first read count threshold can be 10 read counts, the second read count threshold can be 50 read counts, and the third read count threshold can be 100 read counts. Block 405A has a read count of 120. Thus, the read count of block 405A is greater than the third read count threshold, and block 405A can remain programmed in SLCs during a subsequent write operation. Block 405B has a read count of 60. Thus, the read count of block 405B is greater than the second count threshold but lower than the third read count threshold, and block 405B can be reprogrammed in MLCs during a subsequent write operation. Block 405C has a read count of 32. Thus, the read count of block 405C is greater than the first count threshold but lower than the second read count threshold, and block 405C can be reprogrammed in TLCs during a subsequent write operation. Block 405D has a read count of 8. Thus, the read count of block 405D is lower than the first read count threshold, and block 405D can be reprogrammed in QLCs during a subsequent write operation.

Figure 5:
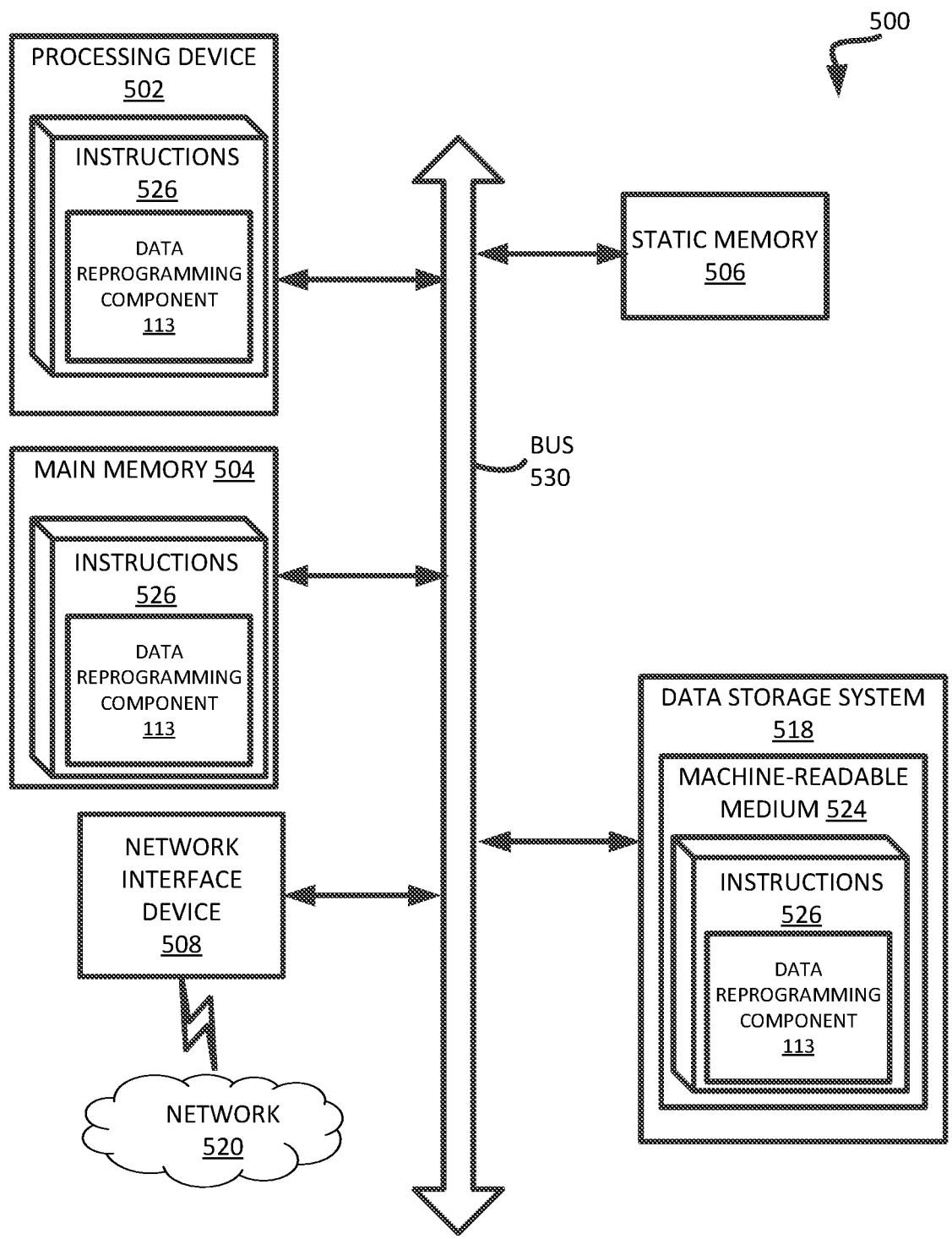
FIG. 5 is a block diagram of an example computer system in which implementations of the present disclosure can operate.

FIG. 5 illustrates an example machine of a computer system 500 within which a set of instructions, for causing the machine to perform any one or more of the methodologies discussed herein, can be executed. In some embodiments, the computer system 500 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the data reprogramming component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage system 518, which communicate with each other via a bus 530.

Processing device 502 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 502 can also be one or more special-purpose processing devices such as an application specific integrated circuit (ASIC), a field programmable gate array (FPGA), a digital signal processor (DSP), network processor, or the like. The processing device 502 is configured to execute instructions 526 for performing the operations and steps discussed herein. The computer system 500 can further include a network interface device 508 to communicate over the network 520.

The data storage system 518 can include a machine-readable storage medium 524 (also known as a computer-readable medium) on which is stored one or more sets of instructions 526 or software embodying any one or more of the methodologies or functions described herein. The instructions 526 can also reside, completely or at least partially, within the main memory 504 and/or within the processing device 502 during execution thereof by the computer system 500, the main memory 504 and the processing device 502 also constituting machine-readable storage media. The machine-readable storage medium 524, data storage system 518, and/or main memory 504 can correspond to the memory sub-system 110 of FIG. 1.

In one embodiment, the instructions 526 include instructions to implement functionality corresponding to a data relocation component (e.g., the data reprogramming component 113 of FIG. 1). While the machine-readable storage medium 524 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
a memory component; and
a processing device, coupled to the memory component, configured to:
responsive to receiving first data to program to a block of the memory component, determine a current mode of operation used by the system to program data to the block;
responsive to determining that the current mode of operation is a first mode of operation, program the first data to a set of memory cells of the block using a first type of memory cells storing a first number of bits per memory cell;
responsive to receiving second data to program to the block; determine that an amount of memory used of the memory component is greater than a capacity threshold;
responsive to determining that a frequency of access to the block meets a criterion, select a new mode of operation to be used by the processing device to program the second data to the block, wherein the system in the new mode of operation utilizes a second type of memory cells storing a second number of bits per memory cell, wherein the second number of bits exceeds the first number of bits; and
reprogram, using the new mode of operation, the block storing the first data by programming second data to the set of memory cells while maintaining the first data programmed to the set of memory cells, thus converting the set of memory cells to the second type of memory cells that stores the second number of bits per memory cell.

2. The system of claim 1, wherein the first type of memory cells comprises single level cells (SLCs).

3. The system of claim 1, wherein the second type of memory cells comprises at least one of: multi-level cells (MLCs), triple level cells (TLCs), quad-level cells (QLCs), or penta-level cells (PLC).

4. The system of claim 1, wherein programing the block using the second type of memory cells comprises: combining bits of data from each memory cell of the block into memory cells of the second type of memory cells.

5. The system of claim 1, wherein the frequency of access comprises at least one of: a duration of time between two consequent accesses operations, a duration of time between a write operation and a read operation, or a rate of access within a time period.

6. The system of claim 1, wherein the processing device is further configured to: receive an indication from a host system comprising an expected frequency of access to the block.

7. The system of claim 1, wherein the first number of bits per memory cell utilized is reverse proportional the frequency of access.

8. A method comprising:
responsive to receiving first data to program to a block of a memory component, determining a current mode of operation used to program data to the block;
responsive to determining that the current mode of operation is a first mode of operation, programming the first data to a set of memory cells of the block using a first type of memory cells storing a first number of bits per memory cell;
responsive to receiving second data to program to the block; determining that an amount of memory used of the memory component is greater than a capacity threshold;
responsive to determining that a frequency of access to the block meets a criterion, selecting a new mode of operation to be used by the processing device to program the second data to the block, wherein the system in the new mode of operation utilizes a second type of memory cells storing a second number of bits per memory cell, wherein the second number of bits exceeds the first number of bits; and
reprogramming, using the new mode of operation, the block storing the first data by programming second data to the set of memory cells while maintaining the first data programmed to the set of memory cells, thus converting the set of memory cells to the second type of memory cells that stores the second number of bits per memory cell.

9. The method of claim 8, wherein the first type of memory cells comprises single level cells (SLCs).

10. The method of claim 8, wherein the second type of memory cells comprises at least one of: multi-level cells (MLCs), triple level cells (TLCs), quad-level cells (QLCs), or penta-level cells (PLC).

11. The method of claim 8, wherein the frequency of access comprises at least one of: a duration of time between two consequent accesses operations, a duration of time between a write operation and a read operation, or a rate of access within a time period.

12. The method of claim 8, wherein the memory component comprises of a first set of single level cells (SLCs), a second set of multi-level cells (MLCs), a third set of triple level cells (TLCs), and a fourth set of quad-level cells (QLCs).

13. The method of claim 8, further comprising: receiving an indication from a host system comprising an expected frequency of access to the block.

14. A non-transitory computer-readable storage medium comprising instructions that, when executed by a processing device, cause the processing device to:
responsive to receiving first data to program to a block of a memory component, determine a current mode of operation used to program data to the block;
responsive to determining that the current mode of operation is a first mode of operation, program the first data to a set of memory cells of the block using a first type of memory cells storing a first number of bits per memory cell;
responsive to receiving second data to program to the block; determine that an amount of memory used of the memory component is greater than a capacity threshold;
responsive to determining that a frequency of access to the block meets a criterion, select a new mode of operation to be used by the processing device to program the second data to the block, wherein the system in the new mode of operation utilizes a second type of memory cells storing a second number of bits per memory cell, wherein the second number of bits exceeds the first number of bits; and
reprogram, using the new mode of operation, the block storing the first data by programming second data to the set of memory cells while maintaining the first data programmed to the set of memory cells, thus converting the set of memory cells to the second type of memory cells that stores the second number of bits per memory cell.

15. The non-transitory computer-readable storage medium of claim 14, wherein the first type of memory cells comprises single level cells (SLCs).

16. The non-transitory computer-readable storage medium of claim 14, wherein the second type of memory cells comprises at least one of: multi-level cells (MLCs), triple level cells (TLCs), quad-level cells (QLCs), or penta-level cells (PLC).

17. The non-transitory computer-readable storage medium of claim 14, wherein the frequency of access comprises at least one of: a duration of time between two consequent accesses operations, a duration of time between a write operation and a read operation, or a rate of access within a time period.

* * * * *